United States Patent [19]

Cerutti

[11] Patent Number: 4,805,092
[45] Date of Patent: Feb. 14, 1989

[54] ELECTRONIC CIRCUIT FOR EXTENDING THE ADDRESSING CAPACITY OF A PROCESSOR

[75] Inventor: Walter Cerutti, Ivrea, Italy

[73] Assignee: Ing. C. Olivetti & C., S.p.A., Ivrea, Italy

[21] Appl. No.: 857,340

[22] Filed: Apr. 30, 1986

[30] Foreign Application Priority Data

Apr. 30, 1985 [IT] Italy ............................... 67396 A/85

[51] Int. Cl.⁴ ........................ G06F 13/00; G06F 12/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,292,151 | 12/1966 | Barnes et al. | 364/200 |
| 3,786,436 | 1/1974 | Zelinski et al. | 364/200 |
| 3,949,378 | 4/1976 | Crabb et al. | 364/200 |
| 3,976,976 | 8/1976 | Knosharian | 364/200 |
| 4,037,211 | 7/1977 | Ikuta et al. | 364/200 |
| 4,042,911 | 8/1977 | Bourke et al. | 364/200 |
| 4,092,715 | 5/1978 | Scriver | 364/200 |
| 4,164,786 | 8/1979 | Gollomp | 364/200 |
| 4,307,448 | 12/1981 | Sattler | 364/200 |
| 4,346,441 | 8/1982 | Plank et al. | 364/200 |
| 4,419,727 | 12/1983 | Holtey et al. | 364/200 |
| 4,443,847 | 4/1984 | Bradley et al. | 364/200 |
| 4,449,184 | 5/1984 | Dohlman, III et al. | 364/200 |
| 4,453,212 | 6/1984 | Gaither et al. | 364/200 |
| 4,473,877 | 9/1984 | Tulk | 364/200 |
| 4,500,962 | 2/1985 | Lemaire et al. | 364/200 |
| 4,503,491 | 3/1985 | Lushtak et al. | 364/200 |
| 4,658,350 | 4/1987 | Eggebrecht et al. | 364/200 |

*Primary Examiner*—Raulfe B. Zache
*Assistant Examiner*—Danh Phung
*Attorney, Agent, or Firm*—Banner, Birch, McKie & Beckett

[57] ABSTRACT

The electronic circuit connects a processor to a high-capacity memory of 1 Megabyte. The processor may be of the 8 bit type, with a 16 bit address bus (A0-A15). The memory is subdivided into 256 segments each having a capacity of 4 Kbytes which can be directly addressed by the processor by means of 12 (A0-A11) of the 16 lines of the address bus. An auxiliary RAM is interposed between the processor and has 1 Mbyte memory and comprises sixteen 8 bit registers (R0-R15), which can be addressed by means of the other four lines (A12-A15), of the address bus. By means of the 8 bit data bus (D0-D7), the 16 registers of the RAM store the numbers of those 16 segments out of the 256 segments of the 1 Mbyte memory, which from time to time are connected to the processor. In this way the processor, while being able to address only 64 Kbytes of memory at a time, has the whole of the 1 Mbyte memory available. The circuit can be applied to data processing and word processing units and electronic typewriters.

13 Claims, 2 Drawing Sheets

ELECTRONIC CIRCUIT FOR EXTENDING THE ADDRESSING CAPACITY OF A PROCESSOR

BACKGROUND OF THE INVENTION

The present invention relates to an electronic circuit for connecting a processor to a high-capacity memory in which the processor comprises a data bus of given width, for example 8-bits, for transferring data from and to the memory, and an address bus having a given width, for example 16 bits, for addressing the memory. In that way the processor can address a given number of bytes at a time, for example 64K.

An electronic circuit is known, in which a first part of the memory in which the basic program is stored is permanently connected to the processor while other parts or segments of the memory containing auxiliary programs are alternatively connected to the processor. Normally both the first part and the other parts or segments of the memory each have a capacity of 32 Kbytes, that is to say equal to half the total capacity which can be addressed by the processor. By way of the input/output port, the processor is capable of selecting that one of the other parts of the memory to associate with the first part which, as stated, is permanently connected thereto.

This known circuit however suffers from the disadvantage that only a part of the memory can be from time to time changed and associated with the processor while a large part thereof remains fixed. In addition, with the subdivision of the address space into only two blocks, execution of the programs is very slow and at times, the capacity of each block being greater than the individual auxiliary program contained therein, it is not always that the whole part of the memory is used.

SUMMARY OF THE INVENTION

The object of the present invention is to make it possible not to have memory zones permanently connected to the processor but that, while the number of bytes which can be from time to time addressed by the processor is fixed, the addressable memory zones may be selected from the entire capacity of the memory that the processor has available.

In meeting this object, and in overcoming the disadvantages of the known circuit, the electronic circuit according to the invention is characterized in that it is provided to extend the capacity of the processor to address a main memory. The memory comprises a large number of locations grouped to define a plurality of segments, wherein the memory segments each have a capacity such as can be directly addressed by means of a first portion of the address bus. The circuit comprises an auxiliary memory interposed between the processor and the high-capacity memory and comprising a number of registers equal to the number of segments of the high-capacity memory which can be connected at one time to the processor. The registers are capable of being addressed by means of a second portion of the address bus for addressing one of the segments in accordance with the contents of the address register, and that the contents of the registers can be modified by the processor by way of the data bus.

These and other features of the invention will be clearly apparent from the following description of a preferred embodiment which is given by way of non-limiting example with reference to the accompanying drawings in which:

BRIEF DESCRIPTION OF THE DRAWINGS

Referring to FIG. 1, an electronic circuit 10 according to the invention provides the connection between a processor 20 and a memory 21 having a high capacity, for example 1 Megabyte.

DESCRIPTION OF THE PREFERRED EMBODIMENTS

The processor 20 may be of any known type but in the embodiment described herein reference will be made to a Zilog Z80 microprocessor which comprises an 8 channel data bus 22 for bi-directional transfer of the 8 bit data (D0–D7), and a 16 channel address bus 23 for addressing the memory 21 and the devices connected thereto, by means of 16 addresses (A0–A15).

Figure 1:
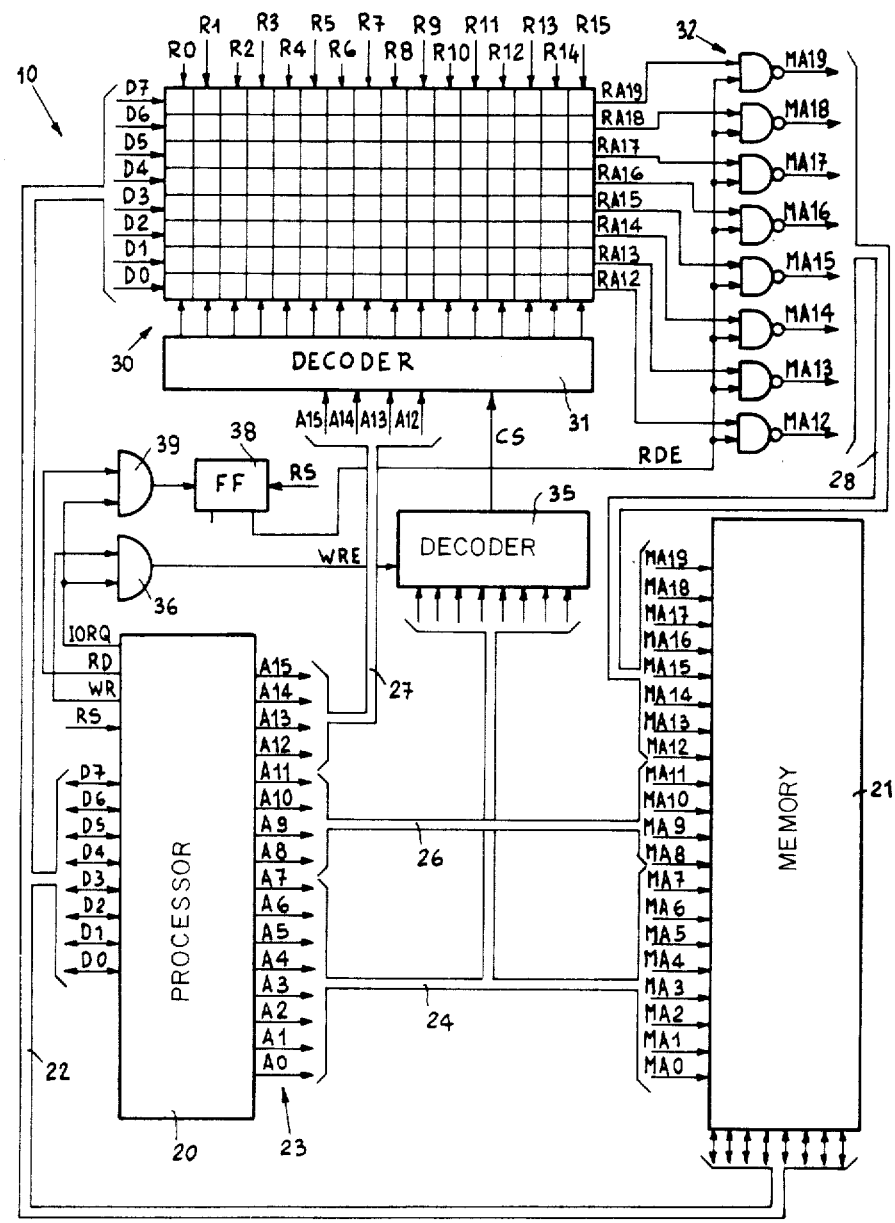
FIG. 1 is a block diagram of an electronic circuit embodying the invention.
Figure 2:
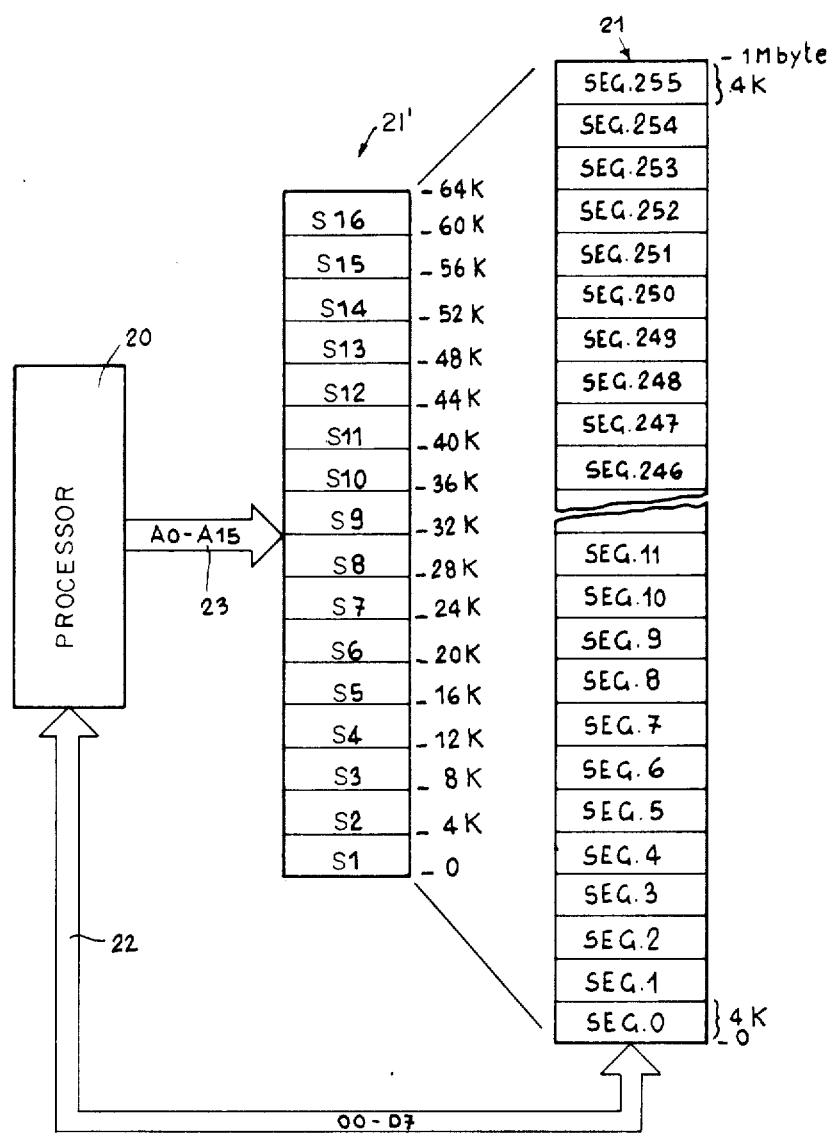
FIG. 2 is a block diagram showing the map for addressing of the high-capacity memory of the circuit shown in FIG. 1.

The high-capacity memory 21 (FIGS. 1 and 2) is connected to the processor 20 by means of the data bus 22 and is subdivided into 256 segments (SEG 0–SEG 255), each of which has locations with a capacity of 4 Kbytes. The memory 21 can be addressed by twenty address bits MA0–MA19, the 12 least significant of which (MA0–MA11) are connected by means of two portions 24 and 26 of the address bus 23 directly to the 12 least significant address bits (A0–A11) of the processor 20.

The circuit 10 further comprises a random access memory 30 (RAM) formed by 16 registers (R0–R15), each of 8 bits. The RAM 30 is associated with a first decoder 31 whose input, by means of a portion 27 of the bus 23, receives the addresses A12, A13, A14 and A15, and whose outputs are capable of enabling the registers R0–R15 one at a time.

The RAM 30 is also connected to the processor 20 by means of the data bus 22 for receiving the data D0–D7 and is capable of generating eight signals RA12–RA19 which, by means of eight corresponding NAND gates 32, generate the eight most significant address signals MA12–MA19 for the memory 21, to which they are passed by means of a bus 28.

The circuit 10 further comprises a second decoder 35 which is capable of generating an enabling signal CS for the first decoder 31 and whose input receives the addresses A0–A7 from the processor 20 and a signal WRE which is generated by an AND gate 36. The inputs of the AND gate 36 receive from the processor 20 a signal WR which is indicative of the fact that a certain item of data (D0–D7) is to be written or stored on one of the memories, and a signal IORQ which is indicative of the fact that the addresses A0–A7 are intended for an input-/output unit for data input or output operations.

The NAND gates 32 are enabled by a signal RDE generated by a flip-flop 38 which has a set input connected to the output of an AND gate 39 and a reset input connected to a general reset signal RS which is also passed to the processor 20.

The AND gate 39 receives from the processor 20 the signal IORQ and a signal RD which is indicative of the fact that data are to be read from one of the memories or an input/output unit.

The mode of operation of the circuit 10 as described hereinbefore is as follows:

Initially, by means of the reset signal RS, the flip-flop 38 is reset in such a way as to put the signal RDE at level O, and consequently all the outputs MA12–MA19 of the gates 32 at level 1. In that way the first of the segments (SEG 0) of the memory 21 is addressed, being the segment containing the items of information relating to the number of the other segments, among the total of 256, to be associated with the processor 20 in this first phase.

The processor 20 reads the items of information stored in the segment SEG 0 and "writes" in each of the registers R0–R15 of the RAM 30 the value of the sixteen memory segments S1 to S16 (FIG. 2) of a portion 21' of the memory 21 with which it is successively connected. For each cycle in the RAM 30, the signals WR and IORQ are brought to level 1 so that the signal WRE, going to level 1, enables the decoder 35 to generate the signal CS which in turn enables the decoder 31. The addresses A12–A15 which are combined together address one at a time the registers R0–R15 in such a way that, when the data D0–D7 arrive from the processor 20, they are stored in the addressed register.

During that writing phase, the signal RDE remains at level 0 and maintains at level 1 the outputs MA12-MA19 of the NAND gates 32.

When the processor 20 is to perform a cycle of reading the RAM 30, it brings to level 1 the signals RD and IORQ which, by means of the AND gate 39, set the flip-flop 38, sending the signal RDE to level 1. In that way, with the RAM 30 being addressed by means of the addresses A12-A15, the registers R0–R15 are read. The content of the each register R0–R15 comes out of the RAM 30 by means of the eight signals RA12–RA19 and, by way of the NAND gates 32, becomes the address code for one of the 256 segments of the high-capacity memory 21.

In that way the processor 20, with 16 bit addressing (A0–A15), manages to be connected to each cell of any one of the 16 segments S1 to S16 of the memory 21, which were previously selected among the total of 256 segments.

At any time moreover the processor 20 is capable of changing the content of the registers R0–R15 of the RAM 30, effecting a writing cycle in the manner described hereinbefore, and thus being connected to other segments of the memory 21.

It will be clear therefore that the processor 20, while being capable of addressing only 64 Kbytes of memory 21 at a time, has the entire 1 Megabyte memory available.

An electronic circuit of the type described hereinbefore may be used in any data processing or word processing units or in electronic typewriters provided with processors.

It will be apparent that the electronic circuit as described herein may be the subject of modifications and addition of parts, without thereby departing from the scope of the present invention.

I claim:

1. An electronic circuit for connecting a processor to a high capacity memory, wherein said processor includes processor address channels for feeding a processor address code, and other channels feeding an input-/output request signal and a write signal, wherein said address channels are subdivided into a first and a second group for feeding a first and a second portion fo said processor address code, respectively; wherein said main memory comprises a large number of main memory locations, and main memory address channels for addressing each one of said main memory locations, wherein said main memory address channels are subdivided into a first and a second group of memory address channels and the number of the memory address channels is larger than the number of the processor address channels, wherein said main memory locations are grouped to define a given number of segments, and wherein the first group and the second group of the memory address channels are actuatable according to a first and a second memory address portion code for accessing each one of the locations and each one of said segments, respectively; said electronic circuit comprising direct connections between the first group of said processor address channels with said first group of memory address channels for accessing locations among said segments according to said first memory address portion code, and segment access means for accessing selectively each one of said segments according to the second memory address portion code of said address code, said segment access means comprising:

an auxiliary memory including a series of registers, auxiliary memory address channels for addressing each one of said registers, and output channels for reading-out the content of an addressed register in response to actuation of its address channel, wherein the number of said series of registers is equal to a fraction of the given number of segments of the main memory, and wherein the content of each one of said registers includes address data representative of the second memory address portion code of a different segment of said main memory;

address decoding means connected with the second group of the processor address channels and with said auxiliary memory address channels for addressing one of said registers and reading-out its content into said auxiliary memory output channels in response to said second processor address portion code;

connecting means for connecting said auxiliary memory output channels with the second group of memory address channels for causing the content of the one accessed register to generate said second memory address portion code for direct accessing of a given segment of said main memory, thereby enabling the direct access of a number of segments equal to said fraction; and writing means responsive to said write signal and to said input/output request signal for writing the address data in said registers wherein said address data define said fraction of the given number of segments of said main memory.

2. An electronic circuit according to claim 1, wherein said writing means comprise first write gate means controlled by said input/output request signal and said write signal, and write decoding means connected with a fraction of said first group of processor address channels and an output signal of said first write gate means for generating a signal enabling the writing of new address data in one of said registers.

3. An electronic circuit according to claim 1, wherein said address data are read-out from a series of locations of said main memory, which are located in a predetermined segment of said main memory, and wherein said writing means causes said processor to transfer selectively said data from the series of locations of said predetermined segment to the registers of said auxiliary memory.

4. An electronic circuit according to claim 3, further comprising initialization means operative on said connecting means for causing temporary access of said predetermined segment and actuation of said writing means for the transferring of the content of any locations of said predetermined segment to said registers.

5. An electronic circuit according to claim 4, wherein the other channels of said processor include a reset channel and a read channel for feeding a reset signal and a read signal, respectively, wherein said initialization means comprise first read gate means interposed between said output channels and said second group of memory address channels, second read gate means enabled by said read signal and the input/output request signal, and bistable means having a reset terminal connected with said reset channel and an output terminal connected with said first read gate means for temporarily forcing a signal on said first read gate means to define the second memory address portion code, thereby addressing said predetermined segment, and wherein said bistable means respond to a signal of said second read gate means for enabling permanent transmission of the content of each register read-out in response to addressing by said address decoding means.

6. An electronic circuit according to claim 3, wherein said writing means comprise first write gate means controlled by said input/output request signal and said write signal, and write decoding means connected with a fraction of said first group of processor address channels and an output signal of said first write gate means for address data in one of said registers, and means for causing said processor to address a locations of said predetermined segment for transferring the content of said addressed location to one register of said auxiliary memory addressed by said address decoding means.

7. An electronic circuit according to claim 3, wherein said processor, said main memory and said auxiliary memory include data channels which are connected with a data bus, respectively, wherein the first group and the second group of the processor address channels are connected with a first portion and a second portion of an address bus, wherein each of said locations of the main memory is provided to store a byte, and wherein said first group of memory address channels are connected with said first portion of the address bus and said address decoding means are connected with said second portion of the address bus.

8. An electronic circuit according to claim 7, wherein the data bus (D0-D7) has 8 bits and the address bus (A0-A15) has 16 bits by means of which 64 Kbytes of the high-capacity memory can be addressed, wherein each of the segments (SEG.0-SEG.255) has a capacity of 4 Kbytes and that the first portion of the address bus comprises 12 address bits (A0-A11).

9. An electronic circuit according to claim 8, wherein the auxiliary memory comprises 16 registers (R0-R15) and the portion of the address bus comprises 4 address bits (A12-A15).

10. An electronic circuit according to claim 9, wherein the high-capacity memory is subdivided into 256 segments (SEG.0-SEG.255) and wherein each of the registers (R0-R15) comprises eight memory cells, each connected to a line of the data bus (D0-D7), whereby the processor determines from time to time which of the 256 segments is to be associated with each of the registers.

11. An electronic circuit for connecting a processor to a high capacity memory, wherein said processor is provided to exchange data from and to said processor and to generate processor address codes having a given number of bits;

wherein said main memory comprises a large number of main memory locations addressable by main memory address codes having a number of bits larger than the number of bits of the processor address codes, and wherein each one of the main memory address codes is subdivided into a first portion code and a second portion code, wherein said main memory locations are grouped to define a series of segments, wherein each segment includes a plurality of locations, and wherein each segment is addressable by the second portion code and each location is addressable by the first portion code of said main memory, respectively; said electronic circuit comprising means for causing a first portion of said processor address codes to directly access a location among a plurality of locations of said segments, and segments access means for generating a given one of said second portion code of said main memory address code in response to a second portion of said processor address codes for selective accessing a given segment of said main memory, said main memory comprises a predetermined segment of said segments including a series of locations on which are stored address signals used to define the second portion code of the main memory address codes; said segment access means comprising:

an auxiliary memory including a given number of registers equal to a fraction of said series of segments;

address decoding means responsive to said second portion of said processor address codes for addressing one register of said auxiliary memory and reading-out the content of the one associated register;

writing means including first means for causing said processor to address the predetermined segment of said main memory and one of said locations for reading-out the stored signal in said one of said locations, and second means for loading selectively said one register with data corresponding to the signals stored in said addressed locations; and connecting means responsive to the content of said one associated register for generating said second memory portion code and accessing the given segment of said main memory among said fraction of segments of the main memory.

12. An electronic circuit according to claim 11, wherein said processor generates a reset signal and a read signal and wherein said predetermined segment includes a group of locations in which are stored initial data for said registers, further comprising initialization means including bistable means connected with said connecting means and responsive to the reset signal for causing said connecting means to be set temporarily in an initial status for the temporary address of only said predetermined segment and the transferring of said initial data in said registers, and read gate means enabled by said read signal and an input/output request signal for generating a gate read signal, and wherein said bistable means respond to said gate read signal for causing said connecting means to enable the permanent access of the segments of said main memory, in response to the content read-out from said registers.

13. An electronic circuit according to claim 11, wherein said processor generates said input/output request signal and a write signal, wherein said second means of the writing means comprise first write gate means controlled by said input/output request signal and said write signal for generating a write control signal, and write decoding means responsive to a fraction of the second portion of said processor address codes and said write control signal for generating a signal enabling the writing of said data in one of said registers.

* * * * *